United States Patent [19]

Vickery

[11] Patent Number: 5,209,010
[45] Date of Patent: May 11, 1993

[54] INSECT KILLER

[76] Inventor: Jack L. Vickery, 4451 E. Main St., Carmel, Ind. 46033

[21] Appl. No.: 835,488

[22] Filed: Feb. 14, 1992

[51] Int. Cl.⁵ ............................................. A01M 1/06
[52] U.S. Cl. ..................................................... 43/139
[58] Field of Search ...................... 43/113, 122, 132.1, 43/138, 139, 134

[56] References Cited

U.S. PATENT DOCUMENTS

| | | | |
|---|---|---|---|
| 1,586,484 | 5/1926 | Suggs | 43/139 |
| 1,816,396 | 7/1931 | Oppenlaender . | |
| 1,819,551 | 8/1931 | Gourdon | 43/139 |
| 2,694,879 | 11/1954 | Stoll | 43/139 |
| 2,737,753 | 3/1956 | Bittner . | |
| 2,778,150 | 1/1957 | Pohlman | 43/113 |
| 3,123,933 | 3/1964 | Roche | 43/139 |
| 3,201,893 | 8/1965 | Gesmar . | |
| 3,214,861 | 11/1965 | Arther . | |
| 3,796,001 | 3/1974 | Jackson | 43/139 |
| 3,987,578 | 10/1976 | Rueff . | |
| 4,218,842 | 8/1980 | Anderson | 43/122 |
| 4,251,945 | 2/1981 | Tasma . | |
| 4,438,585 | 3/1984 | Slatton . | |
| 4,519,160 | 5/1985 | McBrayer . | |
| 4,694,604 | 9/1987 | Mitchell . | |
| 4,856,226 | 8/1989 | Taylor | 43/113 |
| 5,014,460 | 5/1991 | Patti et al. . | |

FOREIGN PATENT DOCUMENTS

| | | | |
|---|---|---|---|
| 254227 | 11/1912 | Fed. Rep. of Germany | 43/139 |
| 618847 | 3/1927 | France | 43/139 |
| 744581 | 4/1933 | France | 43/139 |

Primary Examiner—Kurt C. Rowan
Attorney, Agent, or Firm—Barnes & Thornburg

[57] ABSTRACT

An insect killer comprises a transparent bottle with a removable lid. Entryways are formed in the sidewall of the bottle to allow insect ingress while restricting or discouraging egress. A fan is mounted to the lid and draws air into the bottle through apertures formed in the lid and forces the air out the entryways, propagating the scent of the attractant to the surrounding areas. Striking means are coupled to the fan so that insects flying inside the transparent bottle will be hit by the striking means. The insects so struck will fall into the liquid attractant held in the bottom of the transparent bottle, where they ultimately drown or are stunned to death by other insects.

20 Claims, 2 Drawing Sheets

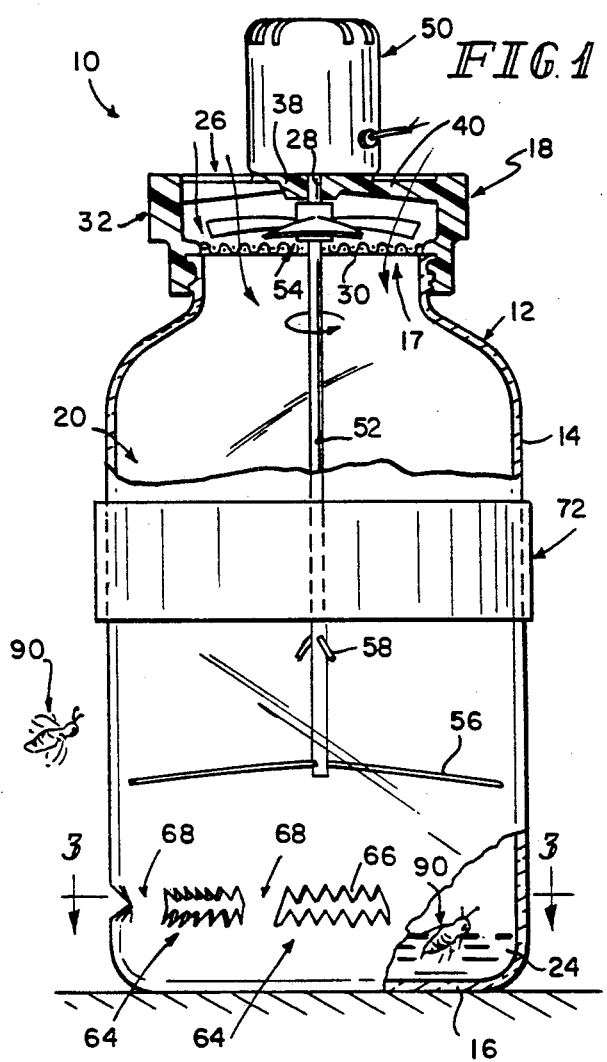
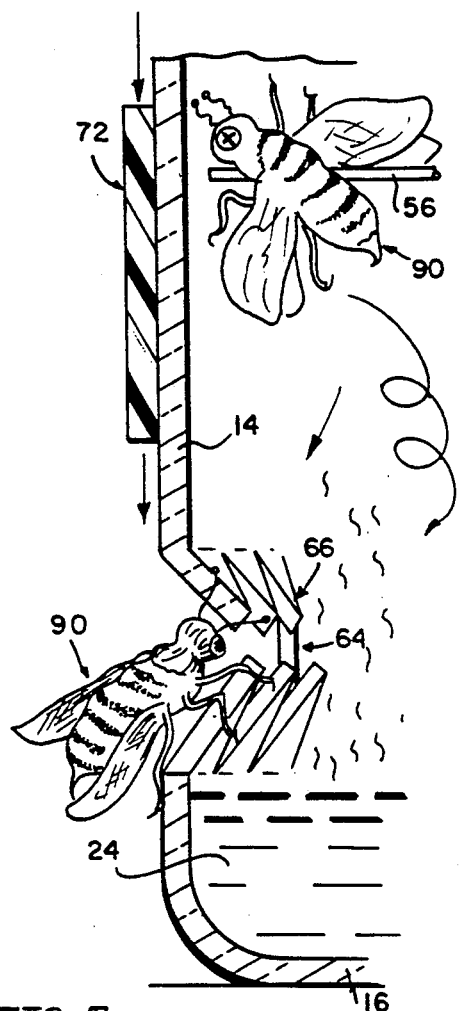
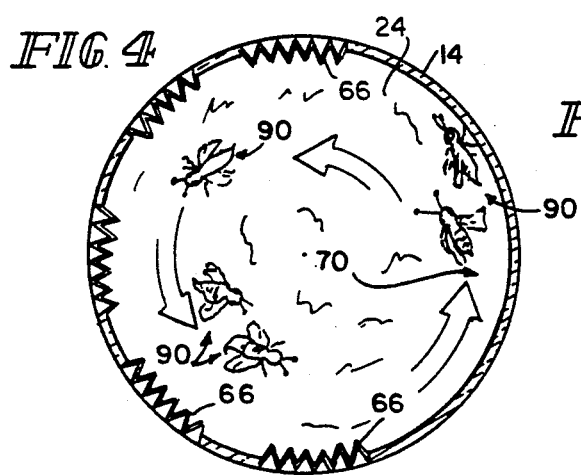
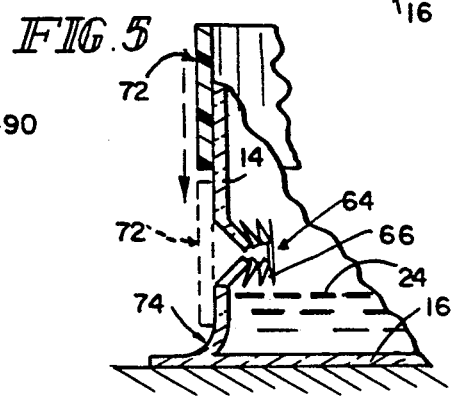

INSECT KILLER

BACKGROUND AND SUMMARY OF THE INVENTION

This invention relates to the field of insect exterminating devices, and more particularly extermination devices from which the scent of a liquid attractant is propagated and striking means is used to fatally or stunningly strike insects within the device.

Flying insects, and particularly yellow jackets have always been bothersome and irritating to humans. The sting of a yellow jacket can be very painful, and in some individuals, can cause severe allergic reactions. For these reasons, it is highly desirable to eliminate yellow jackets from human surroundings.

In the past, chemical attractants have been used to cause flying insects to move toward the exterminating device. However, such chemical attractants also carry a risk of contamination and injury to humans. Motorized insect killers utilizing rapidly rotating blades or elements have been used to exterminate insects. However, the rotating element can injure a persons, and particularly a child's fingers or limbs. Combinations of the two methods have been tried, but until the present invention the inherent disadvantages of each remained.

Various types of prior art insect killing or trapping devices having attractants and/or rotating references: Rueff, U.S. Pat. No. 3,987,578; Bittner, U.S. Pat. No. 2,737,753; Oppenländer, U.S. Pat. No. 1,816,396; Tasma, U.S. Pat. No. 4,251,945; Gesmar, U.S. Pat. No. 3,201,893; Slatton, U.S. Pat. No. 4,438,585; Patti et al., U.S. Pat. No. 5,014,460; Arthur, U.S. Pat. No. 3,214,861; McBrayer, U.S. Pat. No. 4,519,160; Mitchell, U.S. Pat. No. 4,694,604.

According to the present invention, an apparatus for luring and killing insects which is an improvement over the known prior art is provided, the apparatus comprising container means for holding liquid attractant and restricting the movement of insects until they can be killed. Entry means for allowing insect ingress into the container means are formed on the container. Fan means for dispersing the scent of the attractant out through the entry means are mounted on the container means, and striking means for hitting the insects are coupled to the fan means, thereby stunning or killing them. The apparatus further comprises lid means for preventing insect egress from the container, said lid means being removably coupled to the container means.

According to one aspect of the invention, the fan means includes a motor attached to the lid means and a plurality of fan blades driven by the motor about a fan axis. The fan means further includes a shaft extending along the fan axis into the container means. Illustratively, the striking means is a light weight pliable filament attached to the shaft.

According to yet another aspect of the invention the entry means includes inwardly facing saw tooth projections cut into the sides of the container means and pushed inwardly to allow insects to enter the container means while restricting their egress therefrom.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 1 shows the yellow jacket exterminating device with portions broken away;

FIG. 3 is a partial section of the exterminating device;

FIG. 4 is a transverse section of the exterminating device taken along section lines 3—3 of FIG. 1; and FIG. 5 is a partial section similar to FIG. 2, but showing an alternative embodiment of the bottle.

DETAILED DESCRIPTION OF THE DRAWINGS

Figure 2:
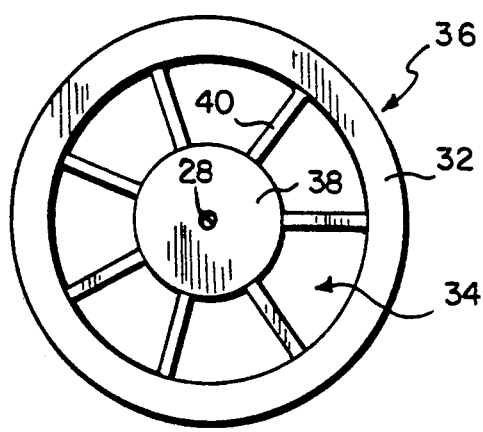
FIG. 2 is a plan view of the lid without the motor.

A yellow jacket exterminating device that lures yellow jackets to the device, allows entry into the device, and thereafter restricts egress, and then fatally or stunningly strikes them in accordance with the present invention is illustratively shown at 10 in FIG. 1. The exterminating device 10 comprises a transparent bottle 12 having a cylindrical sidewall 14 with entry means 64 formed thereon for allowing yellow jacket ingress while restricting egress from the bottle 12. The bottle 12 further comprises a bottom 16 and a lid 18 cooperating with the sidewall 14 to form an interior region 20 for holding a liquid attractant 24 and containing yellow jackets 90 that enter in the interior region 20. Means for fatally or stunningly striking the yellow jackets within the container ar illustratively shown at 56 and 58.

The lid 18 is illustratively of the conventional screw-on type, however, other methods of attachment may be suitable. The lid 18 is illustratively formed to include a sidewall 32 and a top portion 36. In plan view, as shown in FIG. 2, the top portion 36 resembles a wagon wheel, wherein a plurality of support vanes 40 (spokes) extend from the sidewall 32 (rim) to the center 38 (hub) of the top portion 36. The vanes 40, sidewall 32 and center 38 cooperate to define a plurality of generally triangular apertures 34 which are large enough for air and yellow jackets 90 to pass through, but generally too small for fingers. A cylindrical bore 28 is formed in the center 38 perpendicular to the plane of the top portion 36. An electric motor 50, which is preferably DC, but could be AC, is attached to the center 38 of the top portion 36 so that the axis of rotation of the motor 50 coincides with the cylindrical bore 28. A shaft 52 is rotatably coupled to the motor 50 along the axis of rotation of the motor 50 and passes through the cylindrical bore 28 (axis of wagon wheel). A fan blade assembly 54 is coupled to the shaft 52 and located axially along the shaft 52 proximal to the top portion 36 of the lid 18. Screening material 30 is attached to the lid 18 and is axially located distal to the fan blade assembly 54 and operably lies between the mouth 17 of the bottle 12 and the fan blade assembly 54. A hole is formed in the center of the screening material to allow the shaft 52 to pass therethrough.

A number 8 monofilament 56 is attached to the distal end of the shaft 52, the monofilament 56 having a length approximately equal to the diameter of the transparent bottle 12. A second monofilament 58 is attached to the shaft 52 approximately an inch and a half (2.5-3.8 cm) above, and orthogonal to, the first monofilament 56. The shaft 52 is of sufficient length to place the first monofilament 56 in close proximity to the surface of the liquid attractant 24, preferably in the range of about one to two inches (2.5-5.0 cm).

Entryways or entry means 64 are formed in the sidewall 14 of the bottle 12, to be located between the surface of the liquid attractant 24 and the first monofilament 56. The illustrative entryways 64 comprise a plurality of sawtooth projections 66 cut into the sidewall 14 of the bottle 12 and directed inwardly. The sawtooth projections 66 can be formed by cutting a series of x's in the sidewall 14 by using a razor blade and then pushing the sawtooth projections 66 inwardly. It is to be understood that the sawtooth projections 66 could be made by other means, for instance, by cutting a series of w's in the sidewall 14 and pushing the projections inwardly. The object of the sawtooth projections 66 is to allow the yellow jackets 90 to enter the interior region 20 while discouraging or restricting their exit. A plurality of entryways 64 are formed in the sidewalls 14 of the transparent bottle 12, with all entryways 64 being formed an equal distance from the bottom 16 and separated from each other by an unbroken portion 68 of the sidewall 14 in order to retain strength and rigidity within the cylindrical sidewall 14.

The plurality of entryways 64 with the intermediate unbroken portions 68 extend for approximately one-half of the circumference of the bottle 12, leaving approximately one-half of the circumference of the bottle 12 without entryways 64, thereby providing for a pour zone 70. The pour zone 70 allows the attractant and dead yellow jackets to be poured out of the bottle 12 without having the attractant 24 flow out of the entryways 64, thereby allowing for neater cleanup. A concentric cylindrical band 72 having an inner diameter equal to the outer diameter of the transparent bottle 12 is slid over the bottle 12 to frictionally engage the sidewall 14 of the bottle. During transport of the bottle, the cylindrical band 72 is positioned to cover the entryways 64, and has sufficient axial length to completely cover the entryways 64 thereby retaining the liquid attractant 24 inside the bottle 12 and restricting the attractant's outflow through the entryways 64. When the exterminating device 10 is positioned at its desired location, the cylindrical band 72 is repositioned to expose the entryways 64 and allow the scent of the attractant 24 to be dispersed.

To use the extermination device 10, the lid 18 and motor 50 are removed from the bottle 12, thereby withdrawing the attached shaft 52 with the fan blade assembly 54, screening material 30, and monofilaments 56, 58. Liquid attractant 24 is poured into the bottle 12 in sufficient quantity to bring the surface of the attractant 24 up to the vicinity of the entryway 64. In practice, a mixture of beer and maple syrup has been found to provide suitable results, although other liquid attractants could be used. For environmental safety reasons, attractants may preferably be non-poisonous materials that will not harm young people, animals or the environment. The lid 18 and motor 50 are then reattached to the bottle 12, and the cylindrical band 72 positioned to cover the entryway 64. When placed at the desired location, the cylindrical band 72 is repositioned to expose the entryways 64, and the motor 50 is turned on. The motor 50 drives the shaft 52 and thereby the fan 54 and monofilaments 56, 58. The fan 54 draws air through the apertures 34 in the top portion 36 of the lid 18 and pushes it down through the screening material 30 into the interior region 20 of the bottle 12. The rotating action of the fan 54 and the monofilaments 56, 58 set up swirling air currents within the interior region 20, the air currents picking up the scent of the attractant 24 and carrying it out the entryways 64 to be dispersed throughout the local surroundings.

Yellow jackets 90, being attracted to the bottle 12 by the scent of the attractant 24, enter the interior region 20 through the entryways 64. Once inside the bottle 12, the sawtooth projections 64 discourage the yellow jacket's exit. Once trapped inside the bottle 12, the yellow jacket 90 flies around trying to approach the attractant 24. If the yellow jacket 90 flies close enough to get its wings wet with the liquid attractant 24, the sugariness of the attractant 24 severely hampers its ability to fly causing the yellow jacket 90 to fall into the attractant 24, where it either drowns or is stung to death by other yellow jackets 90 in a similar situation. Some yellow jackets 90 will not approach the attractant 24, but will fly upward in the bottle, whereupon they are struck by the monofilament 56, 58 and stunned or killed outright. In either event, the yellow jacket 90 falls into the liquid attractant 24, there to drown or be stung to death if not killed outright. In the unlikely event that the yellow jacket 90 can proceed up the bottle toward the fan and not be struck by a monofilament 56, 58, the screening material 30 prevents its egress from the bottle 12, and the air currents set up by the fan 54 tend to push the yellow jacket 90 down into the vicinity of the monofilaments 56, 58, where it can be struck.

As best shown in FIG. 3, the air currents set up by the fan and the monofilaments 56, 58 impart a circular motion or current to the liquid attractant 24. These currents tend to prevent the yellow jackets 90 from climbing the sidewall 14 to get out of the attractant 24, thereby hastening their demise.

FIG. 5 shows an alternative embodiment wherein the bottom of the bottle is flared outwardly at 74 to provide a more secure base support. In this embodiment, the cylindrical band 72 can only be slid onto the bottle 12 by passing the band 72 over the top.

Although the invention has been described in detail with reference to certain preferred embodiments, variations and modifications exist within the scope and spirit of the invention as described and defined in the following claims.

What is claimed is:

1. An apparatus with an attractant for luring insects therein to be killed, the apparatus comprising;
    container means for holding liquid attractant and restricting the movement of insects until they can be killed,
    entry means for allowing insect ingress to the container means, wherein said entry means are formed on side walls of the container,
    lid means attached to a top portion of the container means for preventing insect egress from the container except through the entry means, fan means for drawing air through the lid means and causing the air to dispense the scent of the attractant out through the entry means, wherein said fan means are mounted on the lid means of the container means, and
    means for striking the insects within the container means, wherein said striking means are coupled to the fan means and in spaced-apart relation to the fan means.

2. The apparatus of claim 1, wherein said lid means is removably coupled to the container means.

3. The apparatus of claim 2, wherein the fan means comprises a motor attached to the lid means and a plurality of fan blades driven by said motor about a fan axis so that the rotation of the fan blades causes air currents to flow into the container means through the lid means and out of the container means through the entry means, carrying with it the scent of the attractant.

4. The apparatus of claim 3, wherein the fan means further comprises a shaft extending along the fan axis, the shaft having a proximal end coupled to the motor and a distal end projecting into the container means.

5. The apparatus of claim 4, wherein the striking means comprises at least one lightweight pliable filament attached to the shaft.

6. The apparatus of claim 1 wherein the means for striking comprises of at least two spaced apart striking means with one of the at least two striking means located closer to the fans means than another of the at least two striking means.

7. The apparatus of claim 1, wherein the fan means comprises a motor and fan blades driven by said motor about a fan axis and an elongated shaft extending beyond the fan blades along the fan axis into the container means.

8. The apparatus of claim 7, wherein the striking means is a pliable filament attached to the shaft and positioned above the surface of the attractant.

9. An apparatus for attracting and killing insects comprising;
a container having sides for holding a liquid attractant and restricting the movement of insects to within the container,
lid means for preventing egress of insects trapped within the container, said lid means being removably coupled to the container,
fan means for urging the insects within the container into the attractant, said fan means being attached to the lid means and drawing air through said lid means into said container means,
means for hitting insects within the container to stun or kill them, said hitting means being drivingly coupled to the fan means, and in spaced-apart relation to the fan means, and
entry means for allowing ingress into the container while discouraging egress therefrom, said entry means being formed in the container.

10. The apparatus of claim 9, wherein the fan means comprises a motor attached to the lid means and a plurality of fan blades driven by said motor about a fan axis so that the rotation of the fan blades causes air currents to flow into the container through the lid means and out of the container through the entry means, carrying with it the scent of the attractant, and further includes a shaft extending along the fan axis, the shaft having a proximal end coupled to the motor and a distal end projecting into the container.

11. The apparatus of claim 10, wherein the striking means is a lightweight pliable filament attached to the shaft.

12. The apparatus of claim 9 wherein the means for hitting comprises of at least two spaced apart striking means with one of the at least two striking means located closer to the fans means than another of the at least two striking means.

13. An apparatus for attracting and killing insects comprising;
a container having sides for holding a liquid attractant and restricting the movement of insects to within the container,
lid means for preventing egress of insects trapped within the container, said lid means being removably coupled to the container,
fan means for urging the insects within the container into the attractant, said fan means being attached to the lid means,
means for hitting insects within the container to stun or kill them, said hitting means being drivingly coupled to the fan means, and in spaced-apart relation to the fan means, and
entry means for allowing ingress into the container while discouraging egress therefrom, said entry means being formed in the container,
wherein the entry means comprises inwardly facing sawtooth projections, the sawtooth projections being cut into the sides of the container and pushed inwardly to allow insects to enter the container while discouraging them from leaving.

14. An apparatus for attracting and killing insects comprising:
a container having sides for holding a liquid attractant and restricting the movement of insects to within the container,
lid means for preventing egress to insects trapped within the container, said lid means being removably coupled to the container,
fan means for urging the insects within the container into the attractant, said fan means being attached to the lid means,
means for hitting insects within the container to stun or kill the, said hitting means being drivingly coupled to the fan means, and in spaced-apart relation to the fan means, and
entry means for allowing ingress into the container while discouraging egress therefrom, said entry means being formed in the container,
wherein the lid means includes screening means for allowing airflow therethrough while preventing insects from escaping from the container.

15. An apparatus using an attractant for luring insects to their death comprising;
a container having a bottom, a cylindrical sidewall, and a removably coupled lid defining an interior region for holding liquid attractant and insects entering therein,
said lid means preventing insect egress from the container,
entry means for allowing insects to enter the container, said entry means being formed in the container,
fan means for urging airflow into the container through the lid and out through the entry means, thereby dispersing the scent of the attractant, said fan means being attached to the lid, and
striking means for stunningly or fatally hitting insects within the container, said striking means being coupled to the fan means in spaced-apart relation to the fan means.

16. The apparatus of claim 15, wherein the fan means comprises a motor attached to the lid and a plurality of fan blades driven by the motor about a fan axis so that the rotation of the fan blades causes air currents to flow into the container through the lid and out of the container through the entry means, carrying with it the scent of the attractant, and further comprises a shaft extending along the fan axis, the shaft having a proximal end coupled to the motor and a distal end projecting into the interior region.

17. The apparatus of claim 14, wherein the striking means is a lightweight pliable filament drivingly coupled to the distal end of the shaft and in operation extends to the sidewalls of the container.

18. An insect trap comprising;
a container for holding a liquid attractant, the container having a removably coupled lid, wherein the lid comprises screen means for allowing airflow through the lid while preventing insects from escaping from the container,
entry apertures formed in the container,
a fan assembly mounted on the lid wherein the fan comprises a motor attached to the lid and a plurality of fan blades driven by the motor about a fan axis so that the rotation of the fan blades causes air currents to flow into the container through the lid and out of the container through the entry apertures, carrying with it the scent of the attractant, and further includes a shaft extending along the fan axis, the shaft having a proximal end coupled to the motor and a distal end projecting into the interior region, and
a pliable filament drivingly coupled to the shaft for hitting flying insects within the container.

19. An apparatus using an attractant for luring insects to their death comprising;
a container having a bottom, a cylindrical sidewall, and a removably coupled lid defining an interior region for holding liquid attractant and insects entering therein,
entry means for allowing insects to enter the container, said entry means being formed in the container,
fan means for urging airflow into the container through the lid and out through the entry means, thereby dispersing the scent of the attractant, said fan means being attached to the lid, and
striking means for stunningly or fatally hitting insects within the container, said striking means being coupled to the fan means in spaced-apart relation to the fan means.
wherein the entry means comprises inwardly facing sawtooth projections, the sawtooth projections being cut into the sidewall of the container and pushed inwardly to allow insects to enter the container while discouraging them from leaving.

20. An apparatus with an attractant for luring insects therein to be killed, the apparatus comprising;
container means for holding liquid attractant and restricting the movement of insects until they can be killed,
entry means for allowing insect ingress to the container means, wherein said entry means are formed on the container,
fan means for dispersing the scent of the attractant out through the entry means, wherein said fan means are mounted on the container means, and
means for striking the insects within the container means, wherein said striking means are coupled to the fan means and in spaced-apart relation to the fan means,
wherein said container means has sides, and wherein the entry means is provided by inwardly facing sawtooth projections, the sawtooth projections being cut into the sides and pushed inwardly to allow insects to enter the container means while restricting their egress therefrom.

* * * * *